United States Patent [19]

Tsukuma et al.

[11] Patent Number: 4,690,910

[45] Date of Patent: Sep. 1, 1987

[54] SINTERED PRODUCT OF ZIRCONIA AND METHOD OF PRODUCING THE SAME

[75] Inventors: Koji Tsukuma; Takaaki Tsukidate, both of Shinnanyo, Japan

[73] Assignee: Toyo Soda Manufacturing Co., Ltd., Yamaguchi, Japan

[21] Appl. No.: 804,956

[22] Filed: Dec. 2, 1985

Related U.S. Application Data

[63] Continuation of Ser. No. 586,959, Mar. 7, 1984, abandoned.

[30] Foreign Application Priority Data

Mar. 7, 1983 [JP] Japan ................................. 58-35900

[51] Int. Cl.$^4$ ........................ C04B 35/48; C04B 35/50
[52] U.S. Cl. ................................. 501/103; 501/152
[58] Field of Search ............... 501/103, 104, 105, 152

[56] References Cited

U.S. PATENT DOCUMENTS

| | | | |
|---|---|---|---|
| 3,514,252 | 5/1970 | Levy et al. | 501/104 X |
| 4,067,745 | 1/1978 | Garvie et al. | 501/103 OR |
| 4,316,964 | 2/1982 | Lange | 501/126 X |
| 4,341,965 | 7/1982 | Okuo et al. | 501/95 X |
| 4,360,598 | 11/1982 | Otagiri et al. | 501/103 OR |
| 4,525,464 | 6/1985 | Claussen et al. | 501/104 |

FOREIGN PATENT DOCUMENTS

| | | | |
|---|---|---|---|
| 1449899 | 8/1966 | France | 501/103 |
| 924966 | 5/1963 | United Kingdom | 501/103 |
| 159754 | 12/1963 | U.S.S.R. | 501/103 |

OTHER PUBLICATIONS

Duwez et al, "Phase Relationships in the System Zirconia-Ceria", J. American Ceramic Society, vol. 33, No. 9, pp. 274-283, 1950.

Tani et al, Journal of the American Ceramic Society, vol. 66, No. 7, pp. 506-510, 1983.

Longo et al, Ceramurgia, p. 4, 1971.

*Primary Examiner*—William R. Dixon, Jr.
*Assistant Examiner*—Karl Group
*Attorney, Agent, or Firm*—Armstrong, Nikaido, Marmelstein & Kubovcik

[57] ABSTRACT

A sintered product of zirconia comprising $ZrO_2$ and $CeO_2$ in a molar ratio of $CeO_2/ZrO_2$ of 8/92-30/70, and consisting of a crystal phase which is a mixed phase consisting essentially of a tetragonal phase and a cubic phase, or which is a phase consisting essentially of a tetragonal phase, has a high mechanical strength and a high rupture toughness, and is applicable as the constituting materials of tools for machining and cutting, various kinds of dies and nozzles, parts for sliding and other industrial materials.

2 Claims, No Drawings

4,690,910

SINTERED PRODUCT OF ZIRCONIA AND METHOD OF PRODUCING THE SAME

This is a continuation of application Ser. No. 586,959, filed Mar. 7, 1984, now abandoned.

DETAILED DESCRIPTION OF THE INVENTION

This invention concerns a $ZrO_2$—$CeO_2$ zirconia sintered product having high mechanical strength and high rupture toughness.

The zirconia sintered product by this invention is preferably applicable as the constituting materials of tools for machining and cutting, various kinds of dies and nozzles, parts for sliding and other industrial materials. Pure zirconia has a reversible phase transition at a temperature of 900°–1200° C., displaying a great variation of volume in this occasion.

The abnormal variation of volume causes cracks on the sintered product, which have been rendering the preparation of sintered product difficult. Accordingly, in case of preparing the sintered product, it is conventional to employ a so-called stabilized zirconia having a crystal structure not displaying the phase transition (hereinafter referred to as FSZ) which can be obtained by adding various kinds of stabilizers, for example MgO, CaO, $Y_2O_3$ or the like in the form of a solid solution.

However, such FSZ sintered product is inferior in mechanical strength such as bending strength, thermal impact strength and the like, and therefore has a defect of being unsuitable for the applications for which the physical properties like these are demanded.

Recently, studies on zirconia sintered product having high strength and high toughness, in which this defect is fundamentally removed, have been carried out.

The reason that this sintered product is different from FSZ sintered product lies in the composition and the crystal structure thereof. In other words, the amount of the stabilizer added in this sintered product is less than in FSZ, from the standpoint of the composition. On the other hand, from the standpoint of the crystal structure, while FSZ is cubic, this product consists of the tetragonal phase or a mixed phase of the tetragonal and the cubic. The sintered product like this is called a partially stabilized zirconia (hereinafter referred to as PSZ). This PSZ sintered product has a high strength and a high toughness, and the reason therefore is explained hereinafter.

That is, in case mechanical stress concentrations are applied to the ends of cracks, particles of the tetragonal phase around them undergo a stress-induced transformation, to the monoclinic, and at this time the accompanying volume expansion disturbs developments of the rupture, which causes the increases in the rupture toughness and rupture strength. Accordingly, in order that the PSZ sintered product be of high strength and of high toughness, it becomes very important for it to contain particles consisting of a tetragonal crystal phase. However, this tetragonal crystal phase is a high temperature phase in most of the zirconia-stabilizing ingredient system, and does not exist as a stable phase at room temperature. Consequently, it is made present as a metastable phase at room temparature, and it, in this case, finds importance in the preparation method of the sintered product and in the kind of stabilizer and the selection of the added amount thereof. At present, as PSZ sintered products of high strength and high toughness, there are known sintered products such as the MgO—$ZrO_2$ system, CaO—$ZrO_2$ system and $Y_2O_3$—$ZrO_2$ system. As the result of our keenly studying to obtain the sintered products which are excellent in the mechanical properties by employing stabilizers other than MgO, CaO and $Y_2O_3$ of the aforesaid stabilizers, the inventors have found that the $ZrO_2$—$CeO_2$ system is extremely effective therefore leading to this invention.

Upon the hitherto investigations, it has been said that sintered products of the $ZrO_2$—$CeO_2$ system do not display high strength and high toughness which are identified in the $ZrO_2$—$Y_2O_3$ system.

This invention has succeeded in obtaining compact sintered products due to the preparing technique of the sintered product, particularly the preparing technique of the starting powders, and further has achieved a result different from the conventional theory by reviewing the composition in detail. That is, this invention provides a sintered product of zirconia comprising of $ZrO_2$ and $CeO_2$ and consisting of a crystal phase which is tetragonal or is a mixed phases of the tetragonal and the cubic.

The sintered product of this invention can be prepared by forming the starting powders of $ZrO_2$—$CeO_2$ system into a desired form by means of a rubber-press or the like and thereafter firing the formed body at a temperature of 1300°–1600° C. for several hours to sinter it.

The starting powders of $ZrO_2$—$CeO_2$ system can be prepared by the so-called dry type synthesis process wherein zirconia powder and ceria powder are mixed together and then the calcination and pulverization are repeatedly applied to the mixed powders, but they can be preferably prepared by the wet type synthesis process, which is explained hereinafter, in order to obtain compact sintered products of high mechanical strength. Wet type synthesis is exemplified by a process wherein an aqueous solution of zirconium salt such as zirconium oxychloride, zirconium nitrate or the like is blended with an aqueous solution of cerium nitrate or the like to give a desired composition, a precipitate formed by adding ammonia water thereto is filtered, and thereafter the precipitate is dried and calcinated to give the desired powders.

Another process is also preferable wherein a mixed solution of the aforesaid zirconium salt and cerium salt is subjected to heating for scores of hours to cause a hydrolysis reaction thereof, and the resultant sol undergoes drying and calcination to give the objected powder.

The powder which can be obtained by these so-called wet type synthesis processes is excellent in sintering property and preferable as the starting material for preparing the sintered product of this invention.

On the other hand, the starting ceria does not necessarily need to be cerium oxide or cerium salt of high purity, and can include light rare earth elements such as samarium, lanthanum and the like, provided cerium is not less than 80%. The starting material is of low price and therefore is preferable for industrial products.

Accordingly, the sintered product of zirconia comprising of $ZrO_2$ and $CeO_2$ means a sintered product wherein $CeO_2$ is mainly used as the stabilizer of $ZrO_2$, which can include oxides of other rear earth element, for example, $Y_2O_3$, $Yb_2O_3$, $La_2O_3$. $Sm_2O_3$ and so on. or MgO, CaO and the like, of alkaline earth metal, or further $Sc_2O_3$, $TiO_2$, $HfO_2$ and the like as oxide of the metal belonging to the third and fourth groups of the periodic Table, in addition to $CeO_2$. With regard to $ZrO_2$—$CeO_2$—$Y_2O_3$ for example, the added $CeO_2$ is considered to make an important contribution toward partial stabilizing thereof in case it is partially stabilized with an amount of $Y_2O_3$ of not more than 2 mol%, which falls under the scope of the sintered product by this invention.

The molar ratio of $CeO_2/ZrO_2$ in the sintered product of $ZrO_2$—$CeO_2$ by this invention is needed to be in a range of 8/92-30-70.

In case this molar ratio of $CeO_2/ZrO_2$ is less than 8/92, it is extremely difficult to obtain the sintered product consisting of a tetragonal crystal phase. In this case, in course of cooling to room temperature after sintering of the sintered product, phase-transformations from the tetragonal to the monoclinic occur, which sometimes induces cracks on account of the accompanied volume expansion at this time.

On the other hand, in case the molar ratio is beyond 30/70, though the sintered product having the desired crystal phase which consists of the coexisting crystal phases of the tetragonal and the cubic, rupture toughness and rupture strength as high as expectable can not be attained, because the ratio of the tetragonal is decreased. In the sintered product of this invention, the crystal phase consists essentially of the tetragonal or of a mixed phase of the tetragonal and the cubic, which allows the coexistence of a small amount of the monoclinic in addition to the above crystal phase. The allowable amount of the monoclinic is not more than 30 wt%.

The determination thereof is made through the X-ray diffraction method as follows. Assuming that X-ray diffraction strength of $<111>$ face and $<11\bar{1}>$ face of the monoclinic, $<200>$ face of the tetragonal and $<200>$ face of the cubic and $M<111>$, $M<11\bar{1}>$, $T<200>$ and $C<200>$, a strength ratio of $(M<111>+M<11\bar{1}>)/(T<200>+C<200>+M<111>+M<11\bar{1}>)$ is made to express weight % of the monoclinic therein. The grain size of the sintered product by this invention is preferable to be 2 μm and less, and it becomes 0.2-0.5 μm at a 1400° C. sintering temperature and 1-2 μm at 1600° C. temperature.

A phenomenon has been conventionally known in that the PSZ sintered product deteriorates with lapse of time when exposed to a high temperature for a long time to cause the rupture of the sintered product. For example, with respect to a $Y_2O_3$—PSZ sintered product having the particle diameter of more than 2 μm, on being left along at a temperature of 200°-300° C. for long time, the tetragonal transforms to the monoclinic and it results that cracks are found on the sintered product. That is to say, the smaller the particle diameter thereof is, the less the thermal deterioration with lapse of time is. The sintered product of this invention can be readily controlled to a particle diameter of less than 2 μm, and the sintered product like this is preferable on account of excellent thermal stability.

Further, the sintered product of this invention is endowed with a characteristic of three points strength being 50 kg/mm² or more and of rupure toughness being $4MN.m^{-1.5}$ or more as its mechanical strength.

Those products below these characteristic values are not preferable, because they can not withstand applications as parts for industrial uses, for which the sintered product of this invention is useful.

Next, the sintered product of this invention is explained in details by examples.

Determinations of three points strength and rupture, toughness in examples were carried out by the following measurement method.

The three points strength was determined according to, conditions of span length 30 mm and load adding rate 0.5 mm/mm stipulated in JIS R1601 on square rod-like piece of 3 mm×4 mm×40 mm which was prepared by cutting and machining, sintered plate.

The rupture toughness was determined by the indentation method wherein a Vicker's pressing piece was struck into face of the sintered test piece, and then the rupture toughness was calculated from the ratio of length of a struck flaw to length of crack generated from the struck flaw, wherein the load of striking the pressing piece thereinto was set to be 20 kg.

The calculating formula employed in the above calculation was the following one mentioned in D. B. Marshall and A. G. Evans, J. Am. Ceram. Soc. 64 (12), (1981).

$$K_{IC} = 0.036 E^{0.4} P^{0.6} a^{-0.7} (C/a)^{-1.5}$$

wherein
$K_{IC}$: rupture toughness $(N.m^{-1.5})$
E: modulus of elasticity $(N.m^{-2})$
P: load $(N.m^{-2})$
a: length on diagonal of struck flaw (m)
C: length of crack generated from the struck flaw (m)

EXAMPLE 1-6, COMPARATIVE EXAMPLE 1

An aqueous solution of zirconium oxychloride and an aqueous solution of nitrates consisting of 80% cerium and the remainder being light rare earth metal such as lanthanum, samarium, neodymium or the like were blended to give a desired composition, which was thereafter subjected to heating at 100° C. for 60 hours without a break to give a resultant sol of hydrolysis. This was dried up to a solid, which was thereafter calcinated at 900° C. and further pulverized in a ballmill for 48 hours to prepare a starting powder of $ZeO_2$—$CeO_2$ system. Next, the above starting powder was made up to a plate-like moulded body of 4 mm, 40 mm and 56 mm in thickness, width and length thereof respectively by the rubber-press process. This moulded body was sintered at a temperature of 1400°-1500° C. for 2 hours to obtain a sintered product of $ZrO_2$—$CeO_2$ by this invention.

With respect to seven sets of the sintered product prepared like this, the content of the crystal phase, particle diameter of the crystal, bending strength and rupture toughness thereof were determined, of which results were shown in Table 1.

EXAMPLE 7, 8, COMPARATIVE EXAMPLE 2

An aqueous solution of zirconium oxychloride and an aqueous solution of cerium nitrate having a purity of more than 99% were blended to afford a desired composition, from which a starting powder of $ZrO_2$—$CeO_2$ was prepared according to the process mentioned in Example 1. This powder was subjected to moulding by the rubber-press process, which was thereafter maintained at a temperature of 1400° C. for 2 hours to give the desired sintered product. With respect to three sets of the sintered product prepared like this the same determinations as mentioned in Example 1 were carried out, of which results were shown in Table 1.

TABLE 1

| | Molar ratio of $CeO_2$/$ZrO_2$ | Sintering temperature (°C.) | Density of sintered product (g/cm³) | Main crystal phase* | $\frac{T<200> + C<200>^{}}{X}$ | $\frac{M<111> + M<11\bar{1}>^{}}{X}$ | Bending strength (kg/mm²) | Rupture toughness (MN/m^{3/2}) | Cracks found on sintered product |
|---|---|---|---|---|---|---|---|---|---|
| Comparative Example 1 | 4/96 | 1400 | — | M | 0.01 | 0.99 | — | — | found |
| Example 1 | 9/91 | 1400 | 6.21 | T | 1.00 | 0.00 | 99 | 16.9 | none |
| Example 2 | 9/91 | 1500 | 6.20 | T | 1.00 | 0.00 | 80 | 15.5 | " |
| Example 3 | 14/86 | 1400 | 6.27 | T | 1.00 | 0.00 | 82 | 5.8 | " |
| Example 4 | 14/86 | 1500 | 6.24 | T | 1.00 | 0.00 | 95 | 6.0 | " |
| Example 5 | 20/80 | 1400 | 6.30 | T + C | 1.00 | 0.00 | 78 | 4.1 | " |
| Example 6 | 28/72 | 1500 | 6.33 | T + C | 1.00 | 0.00 | 65 | 4.0 | " |
| Comparative Example 2 | 6/94 | 1400 | — | M | 0.00 | 1.00 | — | — | " |
| Example 7 | 12/88 | 1400 | 6.18 | T | 1.00 | 0.00 | 75 | 6.5 | " |
| Example 8 | 20/80 | 1400 | 6.19 | T | 1.00 | 0.00 | 77 | 4.8 | " |

*M, T and C denote Monoclinic, Tetragonal and Cubic respectively.
**$T<200>$, $C<200>$, $M<111>$ and $M<11\bar{1}>$ denote strength of X-ray diffraction of $<200>$ face of the tetragonal, $<200>$ face of the cubic, $<111>$ face of the monoclinic and $<11\bar{1}>$ face of that respectively.
X means $X = T<200> + C<200> + M<111> + M<11\bar{1}>$, and it is the total summing up strength of X-ray diffraction of $<111>$ face of the monoclinic, and $<11\bar{1}>$ face of that.

EXAMPLE 9, 10

Each of aqueous solutions of zirconium oxychloride, cerium nitrate and yttrium nitrate were blended to give a desired composition, and to it was added ammonia water to give a pH value 8 to obtain a precipitate, which was then filtered, dried, culcinated at 800° C. and further pulverized in a ballmill for 24 hours to give the starting powder of the $ZrO_2$—$CeO_2$—$Y_2O_3$ system.

The above starting powder is moulded and sintered by the same process as mentioned in Example 1 to give a sintered product by this invention. With respect to two sets of the sintered product prepared like this, the content of the crystal phase, particle diameter of the crystal, bending strength and rupture toughness thereof were determined, of which results were shown in table 2.

It is preferable for applications in which mechanical strength and thermal-mechanical durability are demanded, for example, as industrial materials of cutting bite, extruding or drawing dies, cutter, spray nozzle, ball for pulverization, ball-bearing, mechanical seal, hydraulic instruments constituting parts, internal engine constituting parts and so on, and so on, and therefore it is extremely useful in industrial fields.

What is claimed is:

1. A sintered product of zirconia consisting essentially of $CeO_2$ and $ZrO_2$, said product having a crystal phase consisting essentially of a tetragonal crystal phase, wherein the mole ratio of $CeO_2$ is 12-14 mole % and the grain size of the sintered product is at most 2 μm.

2. A sintered product of zirconia consisting essentially of $CeO_2$, $ZrO_2$ and $Y_2O_3$, said product having a

TABLE 2

| | Molar ratio of $\frac{CeO_2 + Y_2O_3}{ZrO_2}$ | Sintering temperature (°C.) | Density of sintered product (g/cm³) | Main crystal phase* | $\frac{T<200> + C<200>^{}}{X}$ | $\frac{M<111> + M<11\bar{1}>^{}}{X}$ | Bending strength (kg/mm²) | Rupture toughness (MN/m^{3/2}) | Cracks found on sintered product |
|---|---|---|---|---|---|---|---|---|---|
| Example 9 | $\frac{9 + 1}{92}$ | 1400 | 6.10 | T | 1.00 | 0.0 | 85 | 16.2 | none |
| Example 10 | $\frac{10 + 1}{90}$ | 1450 | 6.22 | T | 1.00 | 0.0 | 108 | 13.8 | " |

As obvious from the aforesaid results, the sintered product of zirconia by this invention comprises mainly $CeO_2$ as the stabilizer thereof, and is made up of mainly the tetragonal or a mixed phases of the tetragonal and the cubic as the crystal phase thereof.

crystal phase consisting essentially of a tetragonal phase, wherein the mole ratio of $CeO_2$ is 8–10 mole %, the mole ratio of $Y_2O_3$ is 1–2 mole %, and the grain size of the sintered product is 2 μm.

* * * * *